United States Patent [19]

Breckner

[11] Patent Number: 5,195,027

[45] Date of Patent: Mar. 16, 1993

[54] CONTROL CIRCUIT LAYOUT FOR A TECHNOLOGICAL PROCESS WITH A LARGE CONTROL RANGE

[75] Inventor: Kurt Breckner, Waiblingen, Fed. Rep. of Germany

[73] Assignee: Eckardt AG, Stuttgart, Fed. Rep. of Germany

[21] Appl. No.: 701,762

[22] Filed: May 17, 1991

[30] Foreign Application Priority Data

May 18, 1990 [DE] Fed. Rep. of Germany ....... 4016017

[51] Int. Cl.⁵ ........................................... G05B 13/02
[52] U.S. Cl. ................................. 364/160; 364/180; 364/182; 318/591
[58] Field of Search ................................. 364/160–163, 364/180–182, 148, 137, 152–154; 318/590–596

[56] References Cited

U.S. PATENT DOCUMENTS

| | | | |
|---|---|---|---|
| 3,940,594 | 2/1976 | Bleak et al. | 364/161 |
| 4,143,415 | 3/1979 | Klingbeil | 364/182 |
| 4,447,869 | 5/1984 | Herzog | 364/160 |
| 4,458,189 | 7/1984 | Dollerschell | 318/591 |
| 4,682,279 | 7/1987 | Watabe | 364/180 |
| 4,901,625 | 2/1990 | Bussan et al. | 364/182 |

FOREIGN PATENT DOCUMENTS 2510992 9/1976 Fed. Rep. of Germany .
2839476 4/1980 Fed. Rep. of Germany .
3517008 11/1986 Fed. Rep. of Germany .

*Primary Examiner*—Jerry Smith
*Assistant Examiner*—Thomas E. Brown
*Attorney, Agent, or Firm*—Burns, Doane, Swecker & Mathis

[57] ABSTRACT

A control circuit layout of a control system is divided into two partial strands 110, 112 connected in parallel, each partial strand 110, 112 provided with two control elements 114, 118 of different sensitivity. Supplemental controls 140, 142 assure the automatic transition without jolting between the partial strands 110, 112 whenever the range is exceeded or, declined by, the set control variable value. If needed, each partial strand is provided with its own measuring apparatus.

12 Claims, 3 Drawing Sheets

CONTROL CIRCUIT LAYOUT FOR A TECHNOLOGICAL PROCESS WITH A LARGE CONTROL RANGE

BACKGROUND OF THE INVENTION

1. Field of the Invention

The invention relates to a control circuit layout for technological processes having large control ranges.

2. Description of Related Art

Conventional control circuits for technological process installations typically include a control element inserted into the process or control system. The setting of the control element is regulated by means of the control circuit so that a controlled variable is maintained at a desired set value. In the case of processes in which the set value of the controlled variable may vary within a wide range as a function of demand, the control element must be designed so that a large range of set values of the controlled variable is possible. The regulating range of the control element must then be chosen accordingly. This, however, necessarily reduces the regulating efficiency of the control element in the area of small set values of the controlled variable, i.e., in the lower load range of the process. The accuracy of control in this range (light load regulation) must be effected, for example, at least during the entry into and exit from the normal load, and therefore regulation is frequently inadequate.

A conventional, single-loop control circuit layout with only one control element inserted in the control system is no longer satisfactory for the exact regulation of many types of technological processes.

DE 28 39 476 B2 discloses a control apparatus with two two-position controllers connected in parallel, wherein controllers have different switching hysteresises and are set for the same set value of the controlled variable. These controllers regulate two control elements located in a single control system. Depending on the load demand, neither of the control elements, or one, or both, are actuated. At the switching points, merely the simple deactivation or actuation of one control element is provided without coordination with the other control element, so that the transitions are not without jolts, thereby causing breaks to appear in the actual value curve of the control element.

In an electronic control apparatus disclosed in DE 25 10 992 B2, a single regulator actuates, with a two-position and a three-position outlet, four similar control elements located in a single loop control system. The control elements are deactivated or actuated as a function of the regulation difference and hysteresis of the controller. In case of higher load demands, here again several control elements are actuated simultaneously. Under this control, the actuation and deactivation of control elements are again not without jolts.

DE 35 17 008 C3 discloses a circuit layout with a two-stage servo amplifier and a single control element. The two stages of the servo amplifier alternate processing the input signal for the common control element whenever a limit value of the controlled-variable is exceeded or not attained. The switching between the electronic servo amplifier stages is effected by means of voltage threshold switches. The provision of only a single control element leads to the fact that in the light load range regulations can be carried out with a lesser sensitivity than in the normal load range.

OBJECTS AND SUMMARY OF THE INVENTION

It is the object of the invention to create a control circuit layout whereby it is possible to regulate a technological process around a set value of a controlled variable within a wide range of variation while maintaining a desired accuracy.

This object is attained by a control circuit layout for a technological process having a large control range, with the following characteristics:

(a) a section of the control system is divided into at least two parallel partial strands;

(b) a control element is located in the first partial strand to control an assigned, partial interval of the entire control range;

(b.1) one control element is located in each additional partial strand having a control range interval coordinated with the entire control range, wherein the control range interval of the control element contains at least the upper boundary value of the control range internal of the preceding control element;

(c) the control elements are preceded by regulators in the formation of the individual strands;

(d) the control circuits of the individual strands are provided to automatically switch, with coupling supplemental controls, in a manner such that (d.1) in the case of a control variable value D in a range of $D_{i-1} \leq D \leq D_i (i=1, 2 \ldots)$, only an i-th control element is maintained in operation, while the other control elements remain closed and that (d.2) if the set value of the control variable value D exceeds or falls below an interval boundary value located within the control range, the first control element, heretofore maintained in controlling operation, is transferred steadily during a transfer period $T_1$ from its control function posture int its closed posture and that simultaneously another control element, entering its control function, is transferred steadily from its closed posture into a control function posture determined by the set value D, wherein (d.2.1) the ratio $(v_1/v_2)$ of the adjusting velocities of the prevailing control elements during the transition period $T_1$ equals the inverse ratio of the interval lengths of the control range intervals assigned to the control elements.

By the parallel division of the control system into several partial strands, and the insertion of a control element in each of these partial strands, together with a regulator associated with each of them, it is possible, depending on the position of the set value of the controlled variable, to control the process with a control element appropriate for the particular set value. The other control elements are maintained in a closed or off posture by their associated supplemental controls. The supplemental controls connect single strand control circuits with each other, so that if the range corresponding to the control element operating at the moment is left, the control system automatically switches to another range without jolting by actuating another the control element resulting from the exceeding or falling below of a range.

The supplemental controls act on the control circuit of an associated partial strand, by altering the signals of both the control element to be deactivated and the control element to be actuated during the transfer of controls, and by determining the rate of control variation as a function of the regulating ranges of the control elements, in a manner such that their respective manipulated values cause no additional control differences and therefore the transition of control between control elements takes place without jolting.

In accordance with the invention, the supplemental controls of adjacent partial strand control circuits are connected to each other by two coupling lines. It is therefore not necessary to connect all of the supplemental controls with each other, particularly when the control circuit is divided into more than two partial strands. Rather, it is sufficient to couple the "adjacent" supplemental controls, i.e., those with control elements which transfer their regulating function between each other. This cascade-like configuration makes possible in a simple manner the addition of further partial strands as needed, together with their associated control devices and supplemental controls.

To the extent that measuring accuracy is adequate, it is advantageous to provide for all of the regulators a common measuring apparatus in which all of the partial strands are connected, so that a common control value may be detected. If, however, the measuring accuracy of a single measuring apparatus is not adequate for accurate regulation over the entire control range, the invention may provide a separate measuring apparatus for the regulator of each of the partial strands. In this manner, the proportion of the controlled variable contributed by each of the partial strands may be detected with a measuring accuracy adequate for the setting accuracy of the associated control element.

In a further embodiment of the invention, the supplemental control simply controls a selection stage. The supplemental control is embodied as a device affecting the selection stage to produce a decreasing or increasing signal. Limit value transducers actuate the supplemental controls by means of contact elements, or switches. The limit value transducers produce signals if a set threshold value is crossed, thereby starting the signal producing supplemental control. The signals of the supplemental control are compared in the selection stage with a signal of the associated control circuit for the particular partial strands. In this manner, the set value of the particular control element is determined by the state of the associated signal producing device in addition to the value measured by the measuring apparatus. By the generation of a rising or declining signal of the signal producing device, the control element involved is transferred, in a stable manner, from a closed or off state to a posture corresponding to the set value of the controlled variable or from the set value posture to the closed or off state.

The coupling of "adjacent" supplemental controls by means of suitable emitted or introduced limit value signals makes possible the variation, in opposing directions, of "adjacent" control elements so that switching takes place as desired, i.e., automatically and without jolting.

In a further embodiment of the invention, each selection stage is supplied with a signal of the associated regulator, in addition to the signal of the signal producing supplemental control, to effect the associated control element directly.

As an alternative embodiment, it is possible to provide the selection stages to command variable values adapted to the partial strands and to pass output signal of the selection stages to the command variable value inlet of the associated regulator. For this, a central command value regulator may be provided, the output signal of which may be passed to each of the supplemental controls by means of a suitable adapter stage preceding it.

BRIEF DESCRIPTION OF THE DRAWINGS

Advantageous forms of embodiment of the invention are shown in the drawings and are described hereinafter. In the drawing:

FIG. 5 shows a control circuit layout for the control of a controlled variable determined by an external command variable setting wherein the control system is divided into two partial strands, each strand including its own measuring apparatus.

DESCRIPTION OF THE PREFERRED EMBODIMENTS

Figure 1:
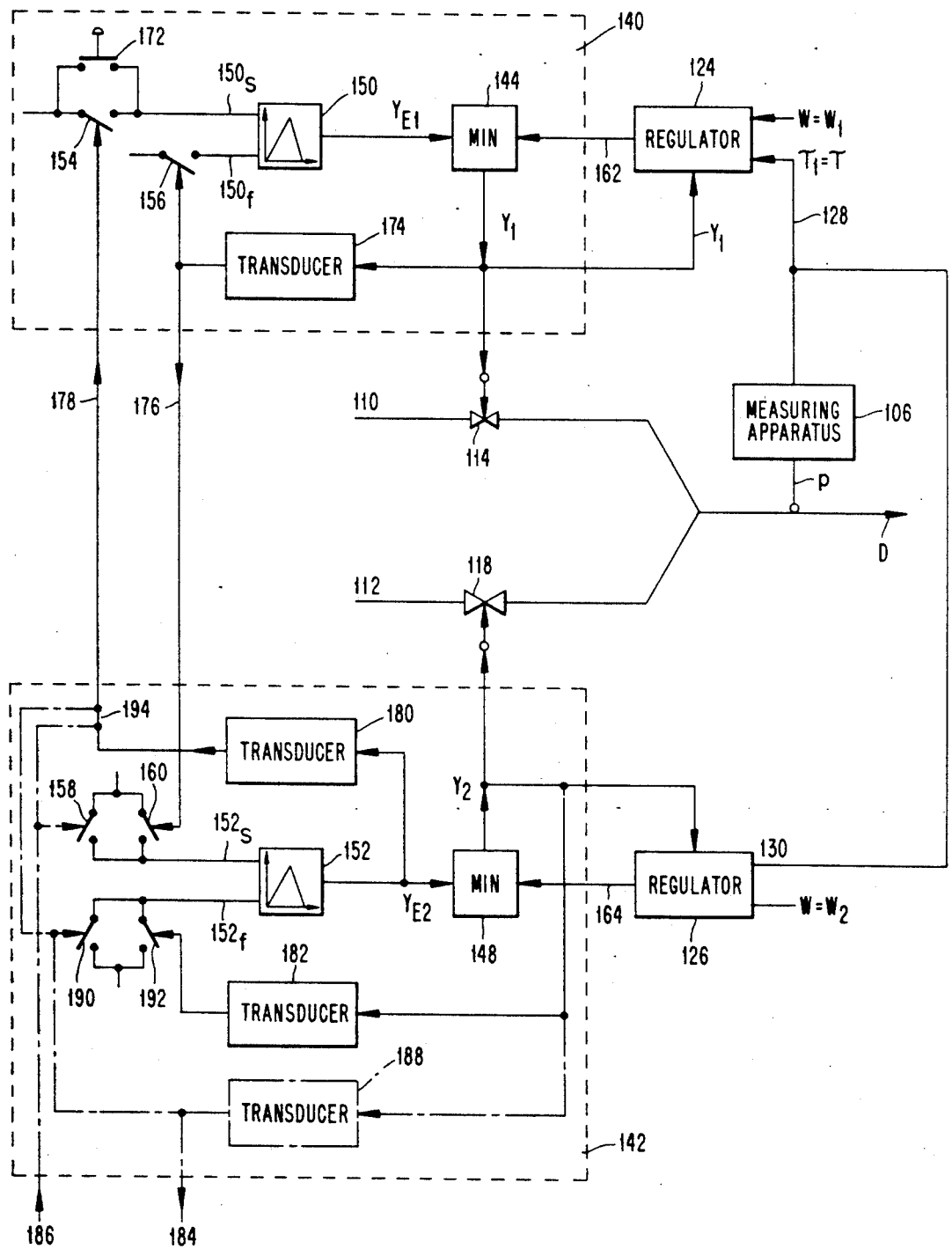
FIG. 1 shows a control circuit layout for the control of set value of a controlled variable, determined by the consumer side of the system, with a control system divided into two parallel partial strands and a common measuring apparatus.

FIG. 1 shows a section of a process or control system 100, which supplies a process variable D to a technological process installation, not shown, characterized by the controlled variable D, in the direction of the arrow. For example, a flow of gas for, e.g., heating installations or burner systems, is envisioned as the controlled variable D. The set value of the controlled variable D is not determined from the producer side, but is generated by the demand on the consumer side.

The controlled variable D is detected by means of the line pressure (p) and the associated control circuit attempts to maintain a given pressure (p) constant in the control system 100. A measuring transducer 106 detects the pressure (p) in the control system 100 and transforms it into a feedback value signal $\tau$. In case of an increased load demand, the control system 100 reacts to the pressure generated and consequently opens the control elements 114, 118; the control system 100 reacts in an analogous manner in the inverse case.

The consumer dependent load demand is subject to strong variations, so that a wide value range must be controlled for the set value by the regulating system. However, for the desired accuracy of control, the use of only one control element is not adequate, as a control element making possible a high flow rate upon demand cannot be adjusted with adequate accuracy in the light load range. In front of the measuring apparatus 106, therefore, the control system 100 is divided over a partial range into two parallel partial strands 110, 112, combined before the measuring apparatus 106. In the first partial strand 110 is located a first "small" control element 114 for permitting a small maximum flow rate $D_s$ upon the setting of a certain pressure (p).

On the other hand, in the second partial strand 112, a "large" control element 118 is located, which in principle makes possible the setting of any set flow rate value within a large value range ($I_D=[D_0, D_2]$). This situation is shown graphically in FIG. 2. Upon the application of a certain pressure (p), a corresponding flow D increases, depending on the control signals $Y_1$, $Y_2$. The control signals $Y_1$, $Y_2$ are standardized on "one" for the control elements 114, 118, i.e., from $D_0=0$ (control element closed) to the prevailing terminal range value $D_1$, $D_2$ (control element fully open). The larger control element 118 is thus selected so that it covers the entire control range for the controlled variable D. However, as in the area of smaller flows it cannot be set with adequate accuracy, in the interval $I_1=[D_0, D_1]$, the small control element 114 performs the regulation so that the larger control element 118 is used for regulation only in a larger flow range ($D_1$, $D_2$) wherein it can be set with adequate accuracy.

It is obviously possible to design the partial strands 110, 112, for example, with different pipe diameters in addition to the different sizes of control elements 114, 118. This is especially advantageous if Venturi mixers are used as the control elements; here mixing pipes of different sizes must be installed, as in the case of such mixers, the intake suction velocity is no longer sufficient for the production of the reduced pressure required under a pipe specific minimum load.

Depending on the magnitude of the control range ($I_D$), the latter may be subdivided further by the addition of a suitably selected third or even more control elements in a similar manner. Correspondingly, additional partial strands must then be provided. The control circuit layout may also be expanded in a very simple manner by the cascade-like coupling of the individual control circuits for the partial strands into three or more subsystems.

The control circuit for each individual partial strand comprises in each case, a regulator 124, 126 provided at its feedback value inlet 128, 130 with the feedback value $\tau$ of the measuring transducer 106, while at the prevailing command variable inlets $W_1$, $W_2$ a command variable value (w) is fixedly predetermined for the setting of a given pressure (p). Each regulator 124, 126 is followed by supplemental control 140, 142. The supplemental controls 140, 142 produce the control signals $Y_1$, $Y_2$ for their associated control elements 114, 118. To assure that the regulators 124, 126 are at all times at the correct working point, the control signals $Y_1$, $Y_2$ are passed to the regulators 124, 126 externally.

The common elements of the supplemental controls 140, 142 include a minimum selection stages 144, 148, together with a ramp transducers 150, 152 in front of the inlets of the minimum selection stages 144, 148, to start an ascending $150_s$, $152_s$ or a descending $150_f$, $152_f$ signal in accordance with switch state of switching elements 154, 156, 160, 192. The minimum selection stages 144, 148 are provided with, on the one hand, the regulator output signal $Y_{R1}$, $Y_{R2}$ and, on the other hand, the outlet signal $Y_{E1}$, $Y_{E2}$ of the ramp transducer 150, 152. The minimum selection stages 144, 148 select one of these signals as the control signal $Y_1$, $Y_2$. Both ramp transducers 150, 152 are chosen so that, in an uncharged state, a zero signal exists at their outlet $Y_{E1}$, $Y_{E2}$. The first supplemental control 140 for the "smallest" control element 114 additionally has another switching element 172 for initial start-up of the process, as explained below. Also, the first supplemental control 140 contains a limit value transducer 174 provided with the control signal $Y_1$ and set so that it produces a signal whenever the control signal $Y_1$ exceeds the value of one (100%).

The outlet of the limit value transducer 174 is passed, on the one hand, to the control element or switch 156 to start a descending ramp signal at the ramp transducer 150 and, on the other hand, through a coupling line 176 to the switching element 160 within the adjacent supplemental control 142 to start an ascending ramp signal of its ramp transducer 152. In contrast, the adjacent supplemental control 142 contains as essential elements two similar limit value transducers 180, 182 selected so that they produce a signal whenever the input signal falls below a certain value $y_6$, for example $y_6=20\%$. At one limit value transducer 182, the control signal $Y_2$ is input, while its outlet is provided to the switching element 192 to start a descending ramp signal $152_f$ at the ramp transducer 152. The other limit value transducer 180 receives the control signal $Y_{E2}$ of the ramp signal generator 152, while its outlet is provided, by means of a second coupling line 178, to the switching element 154 to start an ascending ramp signal at the ramp transducer 150 within the supplemental control 140.

It is readily possible by means of simple additional measures, given as examples and indicated by dash-and-dot lines within the supplemental device 142, to connect a third supplemental control, not shown, for a third partial strand connected in parallel and a third control element, wherein the third supplemental control has a configuration corresponding to the configuration described above of the second supplemental control 142 and is connected with the latter by means of additional coupling lines 184, 186. It is seen from this how, if needed, an arbitrary number of partial process strands may be coupled with each other, together with their control circuits, by the supplemental controls in a cascade-like manner. It is merely necessary to provide the intermediate stage 142 with another limit value transducer 188 functionally corresponding to the limit value transducer 174 of the supplemental control 140 and with switches 158, 190 connected in parallel with the switching elements 160, 192 and with a switching element 194 at the outlet of the limit value transducer 180 and to connect the additional structural elements in the manner indicated by the dash-and-dot lines. The switching element 194 is selected so that it opens and closes under successive signal exposures in the manner of an alternating switch, with the contact being closed at the start of the process. Obviously, other devices may also be provided as additional structural elements, so as long as they carry out the switching function described hereinbelow.

The operation of the control circuit layout described above is now explained with reference to FIGS. 3 and 4.

Prior to the start-up of the process, the regulators 124, 126 produce an output signal $Y_{R1}$, $Y_{R2}$ generally different from zero and determined by the command variable value (w) and the load dependent feedback variable value $\tau$. However, as the ramp transducers 150, 152 initially emit a zero signal, this is selected by the minimum selection stages 144, 148 as the control signal $Y_1$, $Y_2$, which corresponds to the closed control elements 114, 118. To start the process, a first start is initiated by means of the switching element 172. By a corresponding signal at the inlet $150_s$, the ramp transducer 150 produces an output signal $Y_{E1}$ linearly increasing during a predetermined period of time ($T_1$) from zero to one and remaining at this value. If the set value $D_s$ is in the light load range ($D_s < D_1$), the required value of the control signal $Y_1$ and thus the output signal $Y_{R1}$ produced by the regulator is within a range of zero to one.

At a certain point in time within the rise period ($T_1$), therefore, the regulator output signal $Y_{R1}$ will be less than the ramp transducer signal $Y_{E1}$ and will be subsequently used by the minimum selection stage 144 for process control as the control signal $Y_1$, as the output $Y_{E1}$ of the ramp transducer 150 remains at the value of one.

Figure 3:
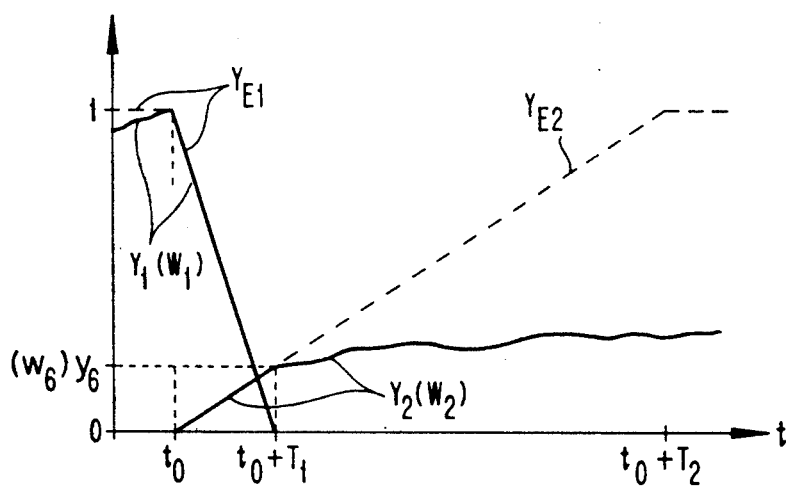
FIG. 3 is a graphical representation of a transition process of the control from the first partial strand to the second partial strand of FIG. 1 after exceeding of the range of the first (light load) control circuit.

If in the course of time the set value $D_s$ is increased by consumer dependent measures and exceeds the maximum value $D_s$, i.e., $D_1$, the control element 114 is just capable of handling in its maximally open position ($Y_1 = 1$), control must be taken over by the process strand 112 and it is thus necessary to switch from the first process strand 110 to the second process strand 112. This case occurs in a similar manner at the end of the rising period ($T_1$) if the set value $D_s$ is already within the normal load range ($D_1 \leq D_s \leq D_2$) upon the actuation of the first start of the process. This transfer process is shown in FIG. 3.

Prior to a time ($t_0$) the control signal $Y_1$ increases in response to the increase in the set value $D_s$. At the time ($t_0$) the maximum control signal ($Y_1 = 1$) is attained. The limit value transducer 174 detects the attainment of the maximum value on at its inlet and produces a switching signal at the switch 156 and the switch 160. As the ramp transducer 150 emits its maximum signal ($Y_{E1} = 1$) following the rise time ($T_1$), the brief closing of the switch 156 now starts a signal linearly declining from one to zero in time ($T_1$). As the set value $D_s$, corresponding to a value ($Y_{R1} = 1$) of the regulator 124, exceeded the value of $D_s$, the selection stage 144 again selects, beginning at time ($t_0$), the ramp transducer output signal $Y_{E1}$ as the control signal $Y_1$. This results in the fact that the control element 114 gradually closes from its fully open position within the time ($T_1$), until at the time ($t_0 + T_1$) it is completely closed.

The signal of the limit value transducer 174 further produces, by the brief closing of the switch 160, a signal at the inlet 152, whereby the ramp transducer 152 produces, again at time ($t_0$), an output signal $Y_{E2}$ linearly rising from zero to one during a predetermined period of time ($T_2$). An intermediate position ($y_6$) of the larger control valve 118, to maintain the same set value $D_s = D_1$ corresponds to the fully open position ($Y_1 = 1$) of the control element 114, wherein it is assumed that ($y_6 = 20\%$). This signifies that the control element 114 permits a maximum flowthrough D larger by a factor of 5 than the smaller control element 114, for example. Correspondingly, at time ($t_0$) the regulator 126 will produce the output signal ($Y_{R2} = y_6$). Beginning at time ($t_0$) therefore the minimum selection stage 148 initially will select the ramp transducer signal 174 as the control signal $Y_2$, until the ramp transducer signal 174 exceeds the regulator output signal $Y_{R2}$. After this, the ramp transducer signal 174 continues to rise until at time ($t_0 + T_2$) it attains the value of one and remains there. The regulator output signal $Y_{R2}$ serves, from the point in time at which the regulator output signal $Y_{R2}$ has fallen below the value of the output $Y_{E2}$ of ramp transducer 152, as the control signal $Y_2$.

Figure 2:
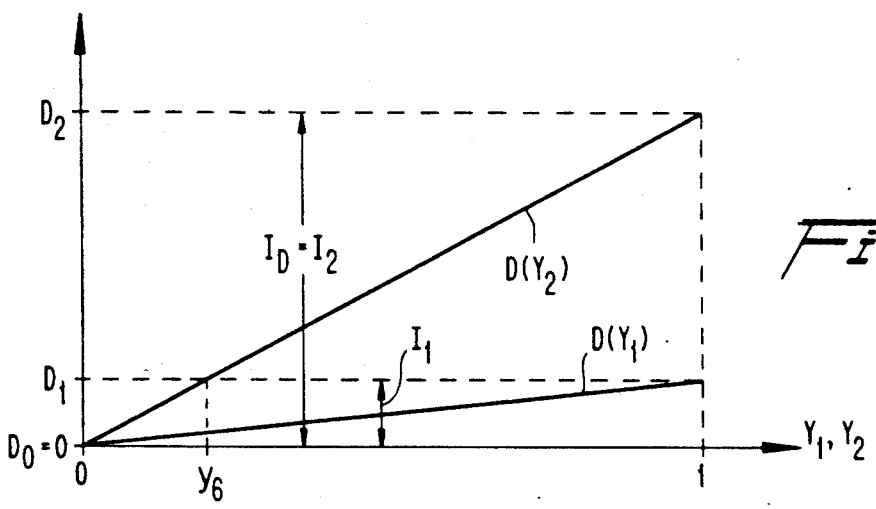
FIG. 2 is a graphical representation of the dependence of the control variable on the setting of the control element in accordance with the control circuit layout of FIG. 1.

In order to insure that the transfer of control takes place without jolting, the rise time ($T_2$) is chosen relative to the rise time ($T_1$) so that the ramp transducer signal 174 attains the value ($y_6$) and thus that of the regulator output signal $Y_{R2}$ exactly at the time ($t_0 + T_1$) at which the first control element 114 is completely closed. For this, the rise times, as seen in FIGS. 2 and 3, must be chosen in relation to the length of the prevailing control range intervals, i.e., $T_1/T_2 = D_1/D_2$ and thus with ($y_6 = 20\%$) a ratio of ($T_1/T_2 = 1/5$). Correspondingly, the ratio of the velocities ($v_1$, $v_2$) at which the settings of the two control elements 14, 118 vary during the duration ($T_1$) of the transfer is inverse, i.e., $v_1/v_2 = T_2/T_1 = 5/1$. This assures that even during the transition ($T_1$), the control circuit layout according to the invention regulates around the set value $D_s$ required, with the regulation during the time ($T_1$) taking place over two process strands 110, 112 and the transfer is effected automatically and without jolting. Naturally, the rise times ($T_1$, $T_2$) are sufficiently short, so that no significant variations of the set value $D_s$ occur during these times.

At the time ($t_0 + T_1$), control has been transferred completely from the first partial process strand 110 to the second partial process strand 112. At a later time ($t_0 + T_2$) the ramp transducer 152 also has again attained a constant state, this time with a maximum output signal of ($Y_{E2} = 1$). Controls in the normal load range ($D_1 \leq D_s \leq D_2$) are now effected over the partial strand 112.

Whenever in the course of the process, at the time ($t_3$) a reduction in the set value $D_2$ causes the set value $D_s$ to again decline below the value $D_1$ and thus the control signal $Y_2$ to decline below the value of ($y_6$), the actuation of an inverse transfer process is necessary, as regulation in the light load range ($D_0 \leq D_s \leq D_1$) is again to be effected by the control element 114. This inverse transfer process is graphically represented in FIG. 4. At the time ($t_3$) the regulator output signal $Y_{R2}$, which is varying slowly relative to the rise times ($T_1$, $T_2$) in keeping with the slow variation of the controlled variable D, and thus the control signal $Y_2$, declines below the limit value ($y_6$). The limit value transducer 182, which recognizes the decline, thereupon produces a signal for the short time closure of the switch 192, and the ramp transducer 152 delivers in response to a corresponding signal at the inlet $152_f$, a signal $Y_{E2}$ decreasing again during the time ($T_2$) from one to zero. As soon as this signal $Y_{E2}$ declines below the regulator's output signal ($Y_{R2} \leq y_6$) at a time ($t_4$), the minimum selection stage 148 selects the ramp signal $Y_{E2}$ as the control signal $Y_2$, leading to the complete closure of the associated control valve 118 at the time ($t_3 + T_2$). Simultaneously, the limit value transducer 180 recognizes the decline of the ramp signal $Y_{E2}$ below the limit value and actuates by the brief closing of the switch 154 through the coupling line 178 at the inlet $150_s$ again the start of a ramp signal $Y_{E1}$ rising in time ($T_1$) from zero to one. As the set value $D_s$ is in the vicinity of $D_s$, which requires an output signal $Y_{R1}$ of the regulator 124 in the range of $Y_{R1} = 1$, the output signal $Y_{R1}$ increases during the transfer duration together with $Y_1$, in keeping with $Y_{R1}$, whereby the control element 114 is guided continuously in the vicinity of its maximum open position.

By the suitable selection described above of the rise times ($T_1$, $T_2$) it is again assured that the control element 114 attains its open position necessary for further regulation at the same time ($t_4 + T_1 = t_3 + T_2$) at which the control element 118 reaches its fully closed state. This in turn again insures the automatic transfer without jolting of controls even if the set value $D_s$ declines below the limit value $D_s$ of the control value D. Following the transfer of controls, the state prevailing after the actuation of the initial start is again attained. Regulation now takes place in the light load range over the partial strand 110 alone, wherein the control value D may be controlled more accurately by means of the more sensitive smaller control element 114.

If the control range ($I_D$) is large enough so that the above described division of the control circuit 100 into two partial strands is no longer adequate, it is possible in a simple manner to effect a division into a plurality (n; $n \geq 3$) of partial strands (110, 112, ...). The entire control range ($I_D = [D_0, D_n]$) is then divided in the manner shown in FIG. 2 into n control range intervals ($I_i = [-D_{i-1}, D_i]$; i=1, 2 ... n), wherein controls are effected i-th control element over the associated partial strand. In a successive expansion by another partial strand with the associated control circuit, it is merely required to carry out the abovementioned measures within the preceding supplemental control, shown in FIG. 1 by the supplemental control 142. If the set value $D_s$ exceeds the set value $D_2$, the limit value transducer 188 which functionally corresponding to the limit value transducer 174, the switch 190 activate within the supplemental control 142 the switch 194 and, via a coupling line 184, a switch corresponding to the switch 160 of the adjacent partial strand 142 in a subsequent third supplemental control, not shown. The brief closing of the switching contact 190 and the signal over the coupling line 184 actuates a transfer process corresponding to FIG. 3 from the second partial strand 112 to third strand, not shown, which takes place in a manner quite similar to the transfer process described in detail relative to FIG. 3 from the first partial strand 110 to the second partial strand 112. The signal of the limit value transducer 188 simultaneously opens the switching element 194 to prevent the actuation of the switching element 154 by the descending ramp signal $Y_{E2}$ over the coupling line 178. This should take place only if previously the supplemental control 142 has again taken over the regulation, for which reason, if the set value $D_s$ has declined below the value $D_2$, the corresponding signal is conducted from the third supplemental control over the coupling line 186 not only to the switching element 158 (corresponding to the coupling line 178 leading to the switching element 154), but also to the switch 194, whereby the switch 194 is closed, so that in case of another decline below the prevailing range ($D_s < D$) a corresponding transfer signal is again transmitted by the limit value transducer 180 to the switching element 154.

Another example of embodiment of a control circuit layout according to the invention is shown in FIG. 5. Means having the same function are given the same reference symbols as in FIG. 1. The process or control system 100 is again divided into at least two partial strands 110, 112 connected in parallel, with a "small" 114 and a "large" 118 control element. The set value $D_s$ of the control value D characterizing the process flow may, in this control circuit layout, be preset on the producer side by means of an adjuster 200 as the corresponding command variable value (w). The control value D is regulated by detecting the flows $F_1$, $F_2$ in the individual strands 110, 112 by means of individual measuring transducers 106a, 106b assigned to each of the partial strands and converting them into feedback values 128, 130 and passed to the corresponding regulators 124, 126. The regulators 124, 126 provide the corresponding control elements 114, 118 with their output signals $Y_{R1}$, $Y_{R2}$ directly as the control signals $Y_1$, $Y_2$.

The supplemental controls 140, 142 are located in this case in front of the command variable value inlets $W_1$, $W_2$ of the regulators 124, 126, the inlets $W_1$, $W_2$ supply the regulators 124, 126 with the output signal of the minimum selection stages 144, 148. As in the case of FIG. 1, the second inlet of the selection stages 144, 148 is fed the output signal $Y_{E1}$, $Y_{E2}$ of a ramp transducer 150, 152. The ramp transducers 150, 52 may again be actuated by means of the switching elements 154, 160 at the inlets $150_s$, $152_s$ to produce an ascending signal, and the switching elements 156, 192 at the inlets $150_f$, $152_f$ to produce a descending ramp signal. The location of the limit value transducer 174 (inside of supplemental control 140) and the transducers 180, 182 (within adjacent supplemental control 142) is again similar to FIG. 1, together with their coupling with the prevailing switching elements and the coupling lines 176, 178 with the single exception that the inlet of the limit value transducer 174 detecting the exceeding of the range by 100%, and the inlet of the limit value transducer 182 recognizing a decline of 20% below the range, are now exposed to a value depending on the command variable (w) on the adjuster 200. For the limit value transducer 182, the value (w) at the outlet of the adjuster 200 itself is used, while the transducer 174 receives the value V(w) augmented by a reinforcing factor V. For this, a proportional element 202 preceding the supplemental control 140 is used. The same signal is conducted, in addition to said limit value transducers 174, 182 through a branching location, to the second inlet of the minimum selection stages 144, 148. The supplemental controls 140, 142 act, not as in FIG. 1 on the regulator output signal, but in the example of FIG. 5 on the command values communicated to the regulators 124, 126. Another difference, the initial starting switch 172 of FIG. 1 is eliminated, and the start of the process is actuated by turning up the command variable value (w) on the adjuster 200. In this case then a ramp transducer 150 is to be used, which in the initial state produces not a zero signal but the maximum "one" signal. The functioning of this control circuit layout may be described as follows:

To start the process, the signal (w=0) is applied to the adjuster 200. This zero signal is transferred to the associated inlets of the minimum stages 144, 148 so that each of these emits a command variable value signal $W_1 = W_2 = 0$ to the regulators 124, 126, which, independently of the value of the control variable D, results in the fact that both control elements 114, 118 are closed. The process is started by turning up the value of (w) on the adjuster 200. However, the ramp transducer 152 retains its initial state in which it transmits a zero signal $Y_{E2} = 0$ to the minimum selection stage 148. The selection stage 148 therefore continues to expose the regulator 126 to the zero signal $W_2 = 0$ in spite of the increasing values of the command variable (w). The control element 118 thus remains closed initially. The ramp transducer 150, on the other hand, exposes the selection stage 144 initially to its maximum signal ($Y_{E1} = 1$). The minimum selection stage 144 therefore transmits the value $W_1 = V(w)$ to the command variable inlet of the regulator 124. The latter thereupon alters the control signal $Y_1$, whereby the control element 114 is opened so that the control variable set value $D_s$ determined by the command variable (w) is just attained. The regulation is thus initially effected entirely over the first partial strand 110, wherein the proportionality factors of the control element 114, measuring transducer 106a and regulator 124 are chosen so that the desired set value $D_s$ is obtained with the command variable value $W_1$. It is additionally advantageous here that now for the sensitively controlled control element 114 a sensitively, measuring transducer 106a is also present. The measuring range $m_1$ of the latter for the flow naturally corresponds to the control range interval $(I_1=[D_0, D_s])$. The set value $D_s$ of the control variable D thereby attains the value $D_s$ as soon as the command variable $W_1$ reaches its full value of one (100%). This is obviously also valid for the second process strand, in particular the measuring range ml of the second measuring transducer 106a corresponds to the control range interval $[D_s=[D_0,D_2]$ covered by the control element 118.

If the value of the command variable $W_1$ of the first regulator exceeds its maximum value of 100% by additional increases of the command variable (w) on the adjuster 200, this is detected by the limit value transducer 174. The latter initiates a switching process such as described in detail relative to FIG. 3. It is merely necessary to replace the prevailing control signal values $Y_1$, $Y_2$ by the command variable values $W_1$, $W_2$ given in parentheses. The limit value transducer 174 triggers a signal $Y_{R1}$ decreasing during the predetermined period of time $(T_1)$ linearly from one to zero of the ramp transducer 150, together with a signal $Y_{E2}$ increasing linearly in the time $(T_2)$ of the ramp transducer 52. Correspondingly, after the actuating time $(t_0)$ the command variable W follows the declining ramp signal $Y_{R1}$, while the command variable $W_2$ initially follows the ramp transducer signal $Y_{E2}$ until the value $W_2=w_6$, which when the range is exceeded $D_5=D_s$, corresponds to the value of the command variable $w=w_6$. Therefore, while the supplemental control 140 necessarily closes the control element 114 within the time $(T_1)$, the command variable $W_2$ is increased by the supplemental control 142 within the same time $T_1$ to the value $w_6$ required for the complete takeover of controls by the process strand 112.

Figure 4:
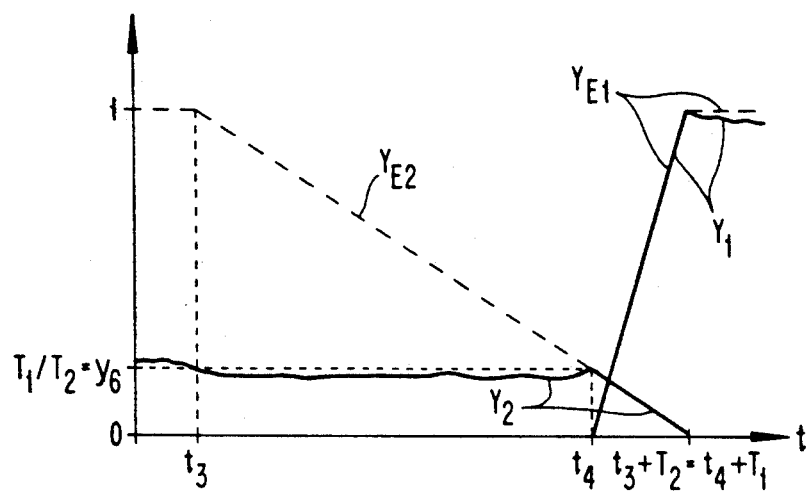
FIG. 4 is a graphical representation of a transition process of the control from the second partial strand to the first partial strand after falling below the switching point of FIG. 3.
Figure 3:
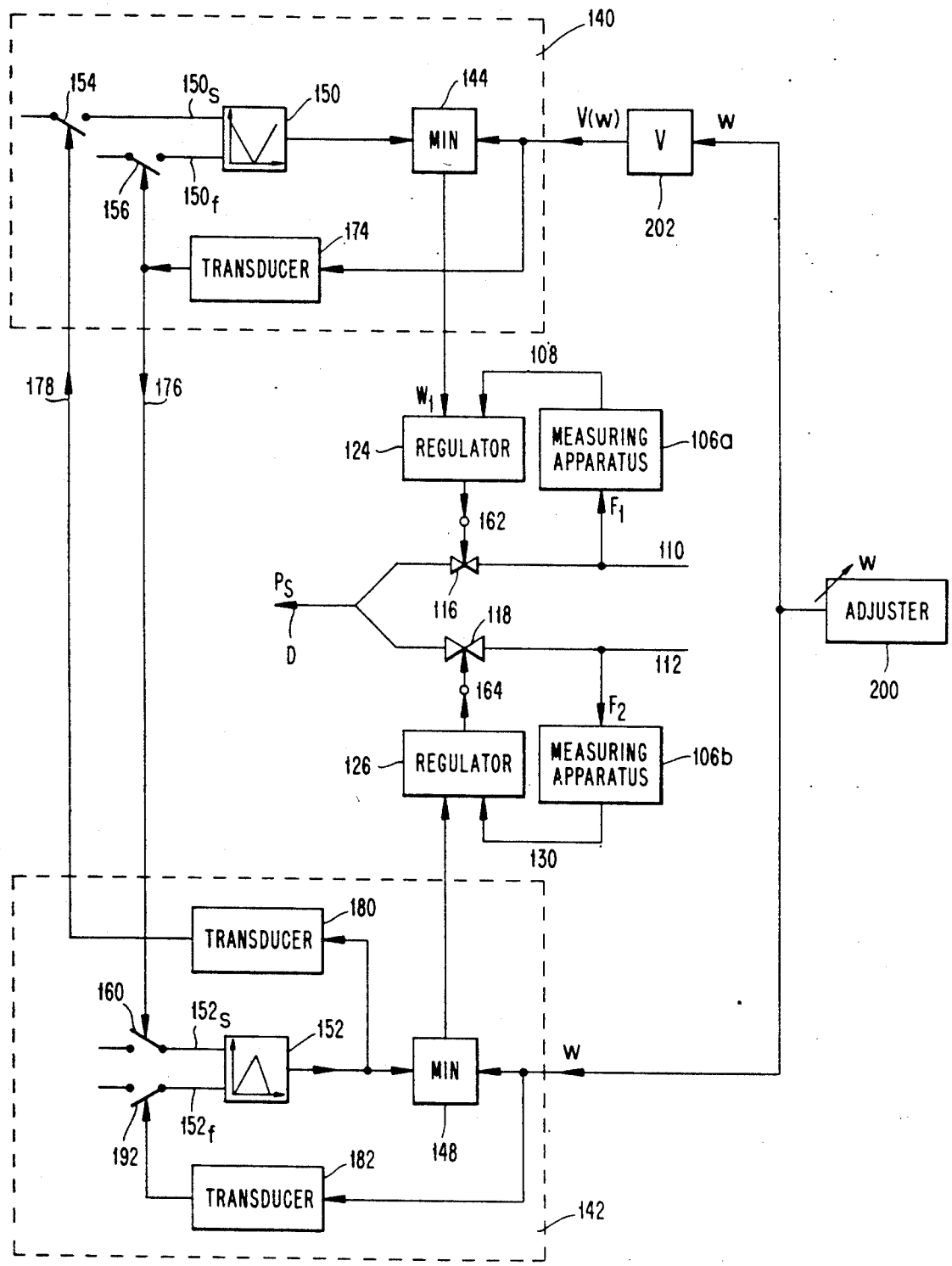

The inverse takeover process from the "larger" process strand 112 to the "smaller" process strand 110 takes place in an entirely similar manner according to FIG. 4 and therefore another detailed explanation relative to FIG. 4 is not necessary.

If in this case again the length ratio of the control range intervals $D_s/D_2=20\%=1/5$ is to be established, it is readily apparent that for the ratio of the rise times $T_1$, $T_2$ and the measuring ranges $m_1$, $m_2$ of the measuring transducers the relationship of $m_1/m_2=T_1/T_2=1/5$ must be valid. In the case of the linear control behavior assumed, the command variable $W_1$ must attain its maximum value of 100%, when the command variable $W_2$ has reached the value of $w_6=20\%$. It follows, that a reinforcing factor of $V=5$ must be set at the proportional element 31 in order to switch controls automatically and without jolts from one process strand to the other.

It is seen finally, that the control circuit layout of FIG. 5 may also be divided in keeping with th explanation relative to FIG. 1 into more than two partial strands and equipped a corresponding number of supplemental controls. For such an expansion, in addition to the supplemental measures to be transferred analogously to the present case, it is merely necessary within the supplemental control 142 to insert a proportional element in front of it and to conduct the output signal of the adjuster 30 directly to the additional third supplemental control, which does not need to be explicitly demonstrated here. After, only the reinforcement factors of the two proportional elements must be selected in the manner desired.

The invention claimed is

1. Control circuit layout divided into adjacent parallel partial strands, comprising:
   a first control element located in a first partial strand for controlling, in accordance with a control signal, a technological process over a partial control range of a first interval of the entire control range;
   a first regulator for supplying the control signal to the first control element;
   at least one adjacent control element located in an adjacent partial strand for controlling, in accordance with a control signal, a technological process over a partial control range of a second interval coordinated with the entire control range, said second interval containing at least one interval boundary value of an adjacent control element;
   at least one adjacent regulator for supplying the control signal to said at least one second control element;
   a first and at least one adjacent supplemental controls for automatically switching between the control circuits of adjacent strands in a manner such that
   if a control variable value D is in a range of $D_{i-1}\leq D\leq D_i$ (where i=1, 2 ... n and n=the total number of strands), the i-th control element is maintained in operation, while the adjacent control elements remains in an off posture, and
   if an interval boundary value located within the i-th control range is crossed by the control variable value during a transfer period, the i-th control element heretofore maintained in controlling operation is transferred steadily from its control function posture to its off posture and simultaneously an adjacent control element entering the control function is transferred steadily from its off posture to a control function posture determined by the set value, wherein a ratio of adjusting velocities of the control elements during the transition period equals the inverse ratio of interval lengths of the control range intervals assigned to the control elements.

2. Control circuit layout according to claim 1, wherein the supplemental controls of adjacent strands are connected with each other by means of two coupling lines.

3. Control circuit layout according to claim 1, further comprising a common measuring apparatus for providing to the first and adjacent regulators a measurement of the control variable value.

4. Control circuit layout according to claim 1, further comprising a measuring apparatus located at every strand for providing to the regulator of the respective strands a measurement of the control variable value.

5. Control circuit layout according to claim 1, wherein each supplemental control includes
   a selection stage acting on the control element of an associated partial strand,
   ramp transducers effecting the said selection stage, to produce descending and ascending ramp signals,
   limit value transducers for generating a switch signal upon attaining a limit of the control variable value, and
   contact transducers located at inlets of the ramp transducer and controlled by the switch signal of the limit value transducers to cause the ramp transducer to effect the selection stage.

6. Control circuit layout according to claim 5, wherein the selection stages are minimum selection stages, the ramp transducers of the partial strands in an off posture emit a minimum 0% and the ramp transducers of the partial strand performing the control function emit a maximum signal 100%, wherein further if an interval boundary value is exceeded within the control range by a control variable value, the ramp transducer associated with the control element to assume an off posture starts a ramp signal linearly decreasing in time $T_1$ from 100% to 0%, and the ramp transducer associated with the control element entering the control function a ramp signal linearly rising in time $T_2$ from 0% to 100%, wherein the $T_2/T_1$ ratio equals the inverse ratio of the interval lengths of the control range intervals assigned to the respective control elements, and further wherein if an interval boundary value within the control range is crossed from above by the control variable value, the ramp transducer assigned to the control element to assume an off posture initially starts a ramp signal declining in time $T_2$ from 100% to 0% and when the decreasing ramp signal declines below a predetermined value, the ramp transducer associated with the control element entering the control function start a ramp signal linearly rising in time $T_1$ from 0% to 100%, with the (predetermined value)/100% = $T_1/T_2$.

7. Control circuit layout according to claim 6, further comprising a coupling line connects the two contact transducers located at the inlets of the ramp transducers with the outlet of a limit value transducer which detects a signal in excess of 100%, and wherein the coupling line transmits switching signals of the limit value transducer of an adjacent supplemental control, which is fed an output signal of the ramp transducer, upon detecting a decline of the signal below the predetermined value to the contact transducer at the inlet of the ramp transducer of the adjacent supplemental control.

8. Control circuit layout according to claim 5, further comprising at least three partial strands and associated supplemental controls, each intermediate supplemental control comprises two additional contact transducers connected in parallel with the existing contact transducers, another limit value transducer and a switching element which alternatingly interrupts and closes the coupling line leading to the adjacent supplemental controls upon receiving a switching signal from the additional limit value transducer or the coupling line with an adjacent supplemental control.

9. Control circuit layout according to claim 5, wherein the selection stages receive the output signals of the associated regulators and output signals of the selection stages serve as the input signals for the associated control element and act on the limit value transducers, respectively.

10. Control circuit layout according to claim 9, wherein the selection stage output signals are fed back externally to the regulators.

11. Control circuit layout according to claim 5, wherein an outlet of each of the selection stages is connected with a command variable inlet of th associated regulator and wherein each selection stage, together with at least one limit value transducer, are provided with values proportional to the command variable.

12. Control circuit layout according to claim 11, wherein the ramp transducer of the first supplemental control emits, in the initial state, a maximum signal of one, while adjacent ramp transducers emit a minimum signal of zero.

* * * * *